US008568229B2

(12) United States Patent
Fujisawa et al.

(10) Patent No.: US 8,568,229 B2
(45) Date of Patent: Oct. 29, 2013

(54) APPARATUS AND METHOD FOR DISPLAYING PLAYER CHARACTER SHOWING SPECIAL MOVEMENT STATE IN NETWORK GAME

(75) Inventors: Jin Fujisawa, Tokyo (JP); Takashi Anzai, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 4 days.

(21) Appl. No.: 13/340,782

(22) Filed: Dec. 30, 2011

(65) Prior Publication Data

US 2012/0196678 A1 Aug. 2, 2012

(30) Foreign Application Priority Data

Jan. 14, 2011 (JP) ................ P2011-006051

(51) Int. Cl.
*A63F 9/24* (2006.01)
(52) U.S. Cl.
USPC .............. 463/33; 463/30; 463/32; 463/34
(58) Field of Classification Search
USPC ............................. 463/30, 32, 33, 34
See application file for complete search history.

(56) References Cited

U.S. PATENT DOCUMENTS

| 2008/0254882 | A1 | 10/2008 | Watanabe |
| 2009/0005139 | A1* | 1/2009 | Morimoto ............... 463/6 |
| 2011/0039620 | A1* | 2/2011 | Hashimoto ............ 463/36 |
| 2011/0092286 | A1* | 4/2011 | Bradbury et al. ......... 463/31 |
| 2011/0244957 | A1* | 10/2011 | Nishimura et al. ........ 463/31 |
| 2012/0225717 | A1* | 9/2012 | Kuroda et al. .......... 463/31 |
| 2013/0038623 | A1* | 2/2013 | Tezuka et al. .......... 345/589 |

FOREIGN PATENT DOCUMENTS

JP 2008-113696 5/2008

OTHER PUBLICATIONS

U.S. Appl. No. 13/298,589 to Yoichi Kuroda et al., filed Nov. 17, 2011.

* cited by examiner

*Primary Examiner* — Sunit Pandya
*Assistant Examiner* — Shahid Kamal
(74) *Attorney, Agent, or Firm* — Greenblum & Bernstein, P.L.C.

(57) ABSTRACT

In a network game, player characters manipulated by individual players of video game apparatuses belong to the same party to battle with an opponent character. When a player character making a special move is not present in the party, the display screen of each video game apparatus becomes a screen focusing on the player character of the player who uses this video game apparatus. When one of the player characters makes a special move, not only the display screen of the video game apparatus corresponding to this player, but also the display screens of the video game apparatuses corresponding to the other player characters in the party become screens focusing on the player character which makes the special move.

15 Claims, 8 Drawing Sheets

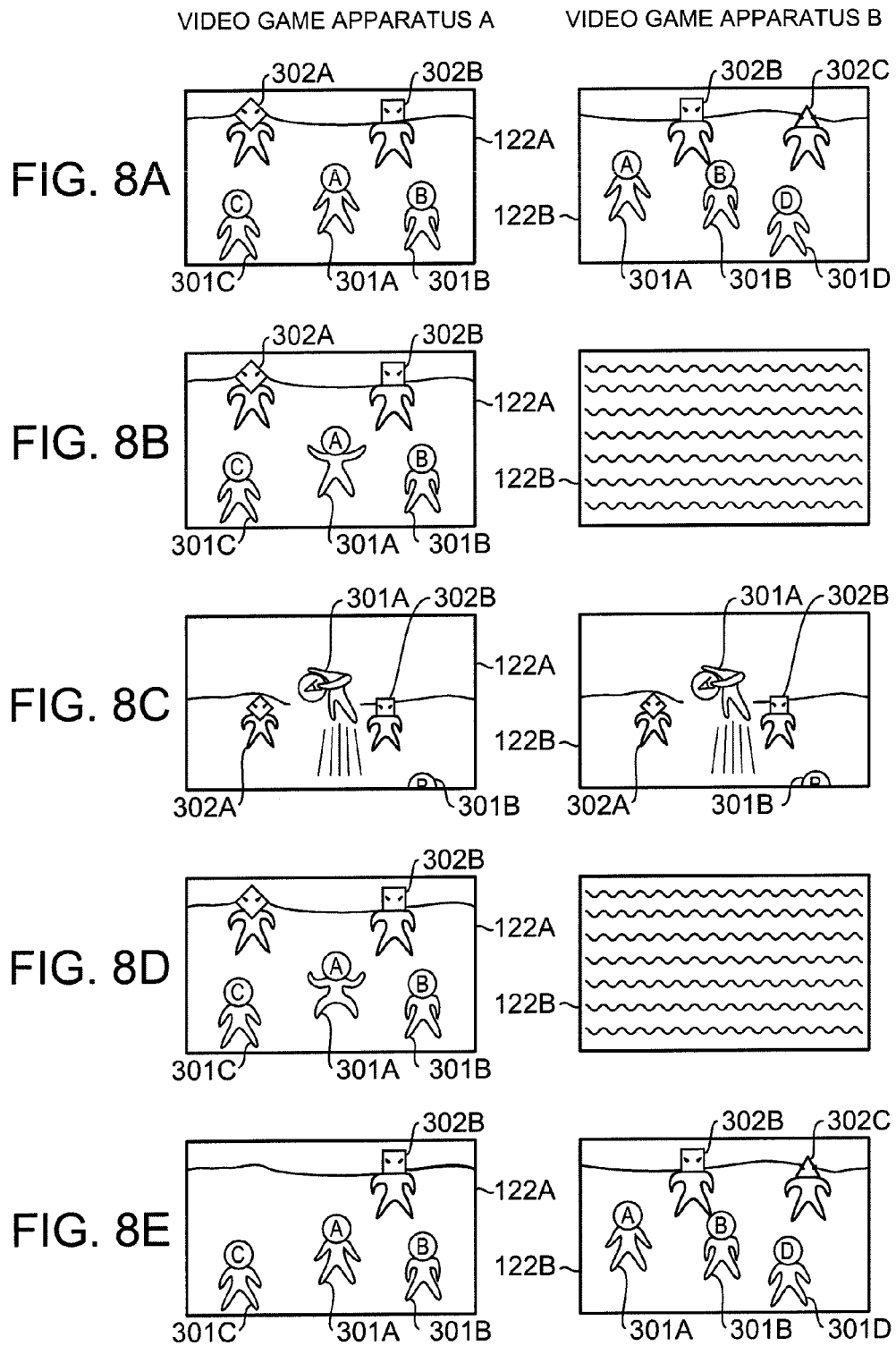

APPARATUS AND METHOD FOR DISPLAYING PLAYER CHARACTER SHOWING SPECIAL MOVEMENT STATE IN NETWORK GAME

CROSS-REFERENCE TO RELATED APPLICATION

The present disclosure relates to subject matter contained in Japanese Patent Application No. 2011-006051, filed on Jan. 14, 2011, the disclosure of which is expressly incorporated herein by reference in its entirety.

BACKGROUND OF THE INVENTION

1. Field of the Invention

The present invention relates to a network game in which a plurality of players participate to progress with the game, and, more particularly, to displaying of a screen showing the progress of a game on a terminal apparatus used by each player.

2. Description of the Related Art

The recent advancement on the network technology has made network games (online games) vivid in each of which a plurality of players participate to progress with the game. A system that executes a network game includes a server apparatus which is managed by one who runs the network game, and client devices of individual players which are connectable to the server apparatus over a network such as the Internet.

An RPG (Role Playing Game) among the network games progresses as multiple players participate in the game at the same time so that their player characters cooperate with one another to battle with an opponent character, or the players make their player characters battle with one another. Recently, an MMORPG (Massively Multiplayer Online RPG) which permits participation of more players is also provided.

In a network game, each client apparatus displays a game screen on its display device. The player of each client apparatus operates an input device to move his/her own player character. As disclosed in Japanese Patent Application Laid-Open Publication No. 2008-113696, the game screen to be displayed on each client apparatus is conventionally generated on the basis of the player character of the player using the client apparatus.

Among players who participate in a network game, there are quite a few players who want to stand out most (who want to make their own player characters standing out most) in the game. Since such a player generally tends to make his/her own player character perform a showy movement as compared to other players, the movement of this player often greatly influences the progress of the game.

However, when a player is attempting to participate in a network game and move his/her own player character, the screen displayed on each client apparatus in the network game is generated on the basis of the player character of the player's own player character, except for a case where the player is watching a movie which is displayed before a special event starts.

Accordingly, the player may not be able to see the movement of another player character which significantly influences the progress of the game. This brings about a problem that the lively feeling of the game is not enhanced. Even if a player makes his/her own player character make a showy movement which significantly influences the progress of the game, other players may not see the movement. In other words, the desire of a player who wants to stand out in a game may not be fulfilled in some cases.

SUMMARY OF THE INVENTION

Accordingly, it is an object of the present invention to permit attention of each player in a network game to focus on a player character showing a special movement state, thereby enhancing the lively feeling of the game.

To achieve the object, according to a first aspect of the invention, there is provided a network game system including a server apparatus, and a plurality of terminal apparatuses connected to the server apparatus over a network, wherein each of players who respectively use the terminal apparatuses manipulates a player's own player character to participate in a game provided by the server apparatus.

The server apparatus includes a character movement information receiver that receives character movement information transmitted from each of the plurality of terminal apparatuses. The server apparatus further includes a special character determining unit that determines whether presence of a player character showing a predetermined special movement state is identified by the character movement information received by the character movement information receiver from each of the plurality of terminal apparatuses. The server apparatus further includes a special character information transmitter that, when the special character determining unit determines that there is a player character showing a special movement state, transmits special character information for displaying a screen basing on the player character showing the special movement state to each of the plurality of terminal apparatuses. The server apparatus further includes a game progressing unit that moves the player character corresponding to each of the plurality of terminal apparatuses according to the character movement information received by the character movement information receiver to progress with the game. The server apparatus further includes a game progress information transmitter that transmits game progress information indicating a progress state of the game progressed by the game progressing unit to each of the plurality of terminal apparatuses.

Each of the plurality of terminal apparatuses includes a game progress information receiver that receives the game progress information transmitted from the game progress information transmitter. Each terminal apparatus further includes a game screen display that generates a screen according to the game progress information received by the game progress information receiver, and displays the screen on a display device equipped in the terminal apparatus. Each terminal apparatus further includes a movement instruction input unit that, as the player who uses the terminal apparatus performs a predetermined operation on an input device equipped in the terminal apparatus, inputs a movement instruction for moving the player's own player character. Each terminal apparatus further includes a special character information receiver that receives the special character information transmitted from the special character information transmitter. Each terminal apparatus further includes a character movement information transmitter that generates movement information according to the movement instruction input from the movement instruction input unit, and transmits the movement information to the server apparatus to be received by the character movement information receiver.

The game screen display includes a normal-mode screen display that generates a screen according to the game progress information basing on the player character of the player using the terminal apparatus when the special character information is not received by the special character information receiver. The game screen display further includes a special-mode screen display that generates a screen according to the game progress information basing on the player character showing the special movement state according to the special character information when the special character information is received by the special character information receiver.

According to the network game system, a plurality of player characters corresponding to players who respectively use a plurality of terminal apparatuses participate in a game. Each terminal apparatus generates a screen according to the progress of the game transmitted from the server apparatus according to the progress of the game, and displays the screen on the display device equipped in the terminal apparatus. A screen to be displayed on the display device of each terminal apparatus is normally generated on the basis of the player character of the player using this terminal apparatus.

Each player character which is caused to participate in a game is moved according to a movement instruction input from the input device by the player using the corresponding terminal apparatus. A player character whose movement state becomes a predetermined special movement state (e.g., a state of making a special move in a battle) in response to the movement instruction input by the player of the player character may appear in player characters corresponding to a plurality of terminal apparatuses.

The server apparatus determines whether there is a player character showing such a special movement state, and transmits special character information for displaying a screen basing on the player character showing the special movement state. When each terminal apparatus receives special character information due to the presence of a player character showing a special movement state, regardless of whether this player character is the player character of the terminal apparatus or not, the terminal apparatus generates a screen basing on the player character in the special movement state, and displays the screen on the display device.

Accordingly, when a player character showing a special movement state significantly influences the progress of the game, particularly, all the players watch the player character in the special movement state on their screens, enhancing the lively feeling of the game. A player who has input a movement instruction from the input device to set his/her own player character in a special movement state can cause other players to watch the special movement of the player's own player character, which fulfills the desire of the player who wants to stand out most (who wants to make player's own player character standing out most) in the game. To achieve the object, a game apparatus according to a second aspect of the invention is a game apparatus connected over a network to a server apparatus providing a game which progresses with a plurality of players manipulating player characters thereof to manipulate the player characters of the players.

The game apparatus includes a game progress information receiver that receives game progress information transmitted from the server apparatus and indicating a progress state of the game according to a state of movement of the player character corresponding to each of the plurality of players. The game apparatus includes a game screen display that generates a screen according to the game progress information received by the game progress information receiver, and displays the screen on a display device of the game apparatus. The game apparatus further includes a movement instruction input unit that, as the player who uses the game apparatus performs a predetermined operation on an input device of the game apparatus, inputs a movement instruction for moving the player's own player character. The game apparatus further includes a special character information receiver that receives special character information transmitted when the server apparatus determines that a player character showing a special movement state is included in the plurality of player characters. The game apparatus further includes a character movement information transmitter that generates movement information according to the movement instruction input from the movement instruction input unit, and transmits the movement information to the server apparatus.

The game screen display includes a normal-mode screen display that generates a screen according to the game progress information basing on the player character of the player using the game apparatus when the special character information is not received by the special character information receiver. The game screen display further includes a special-mode screen display that generates a screen according to the game progress information basing on the player character showing the special movement state according to the special character information when the special character information is received by the special character information receiver.

To achieve the object, a recording medium according to a third aspect of the invention is a computer readable recording medium recording a program which is executed by a computer connected over a network to a server apparatus providing a game which progresses with a plurality of players manipulating player characters thereof to manipulate the player characters of the players.

The program allows the computer to function as a game progress information receiver that receives game progress information transmitted from the server apparatus and indicating a progress state of the game according to a state of movement of the player character corresponding to each of the plurality of players. The program also allows the computer to function as a game screen display that generates a screen according to the game progress information received by the game progress information receiver, and displays the screen on a display device equipped in the computer. The program further allows the computer to function as a movement instruction input unit that, as the player who uses the computer performs a predetermined operation on an input device equipped in the computer, inputs a movement instruction for moving the player's own player character. The program further allows the computer to function as a special character information receiver that receives special character information transmitted when the server apparatus determines that a player character showing a special movement state is included in the plurality of player characters. The program further allows the computer to function as a character movement information transmitter that generates movement information according to the movement instruction input from the movement instruction input unit, and transmits the movement information to the server apparatus.

The game screen display includes a normal-mode screen display that generates a screen according to the game progress information basing on the player character of the player using the computer when the special character information is not received by the special character information receiver. The game screen display further includes a special-mode screen display that generates a screen according to the game progress information basing on the player character showing the special movement state according to the special character information when the special character information is received by the special character information receiver.

BRIEF DESCRIPTION OF THE DRAWINGS

FIGS. 8A to 8E are diagrams showing specific examples of display screens during a battle between a video game apparatus A and a video game apparatus B.

BEST MODE FOR CARRYING OUT THE INVENTION

An embodiment of the invention will now be described with reference to the accompanying drawings.

Figure 1:
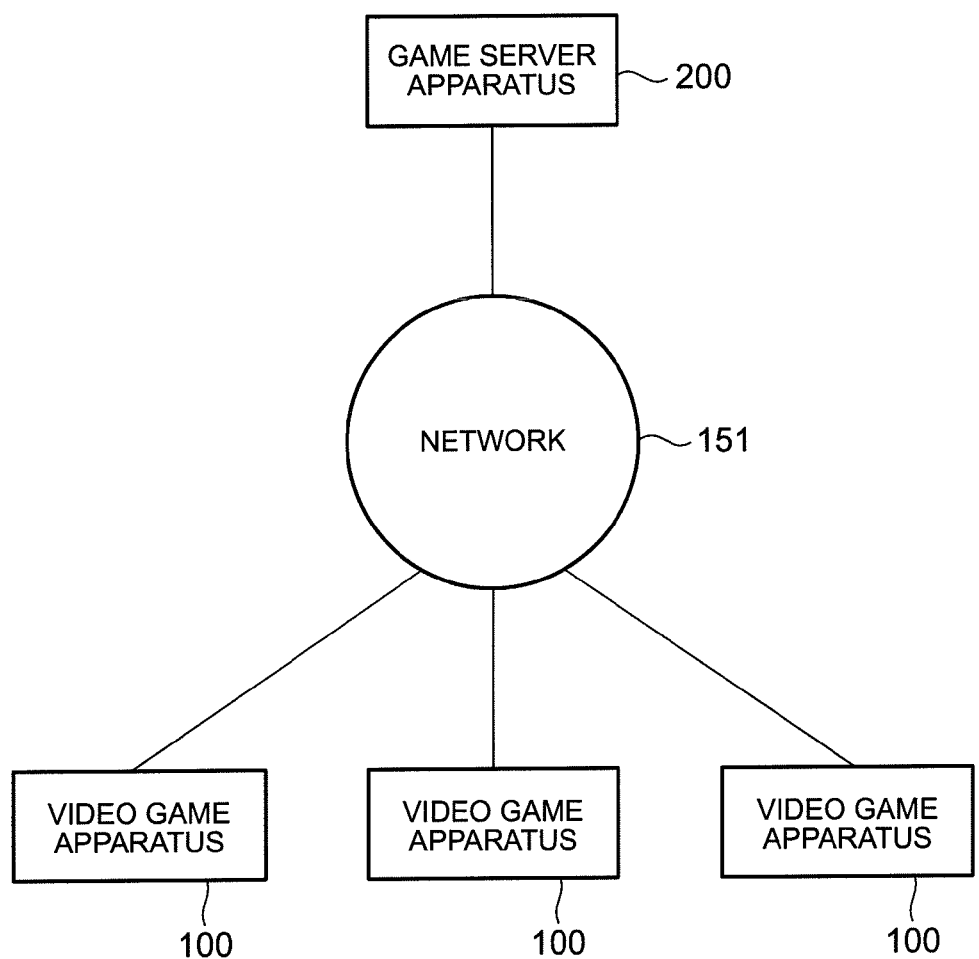
FIG. 1 is a block diagram showing the configuration of a network game system according to an embodiment of the invention.

FIG. 1 is a block diagram showing the general configuration of a network system where a network game according to this embodiment is played. As illustrated, the network system includes a plurality of video game apparatuses 100 connected to a server apparatus 200 over a network 151 like the Internet.

In a game which is applied to this network game system, each player who uses the video game apparatus 100 moves his/her own player character (hereinafter referred to as "player's own player character") on a field formed in virtual space (game space) common to all the players. Each player forms a party composed of the player's own player character and player characters which are moved by other players (hereinafter referred to as "other player characters"). The game progresses party by party.

When the party moves on a field and reaches a predetermined point in the progress of the game, the party battles with an opponent character encountered there. The individual player characters belonging to the party can get an experience value by defeating the opponent character in the battle. The acquisition of the experience value can allow each player to power up the player's own player character, so that the player can defeat a stronger opponent character.

Figure 2:
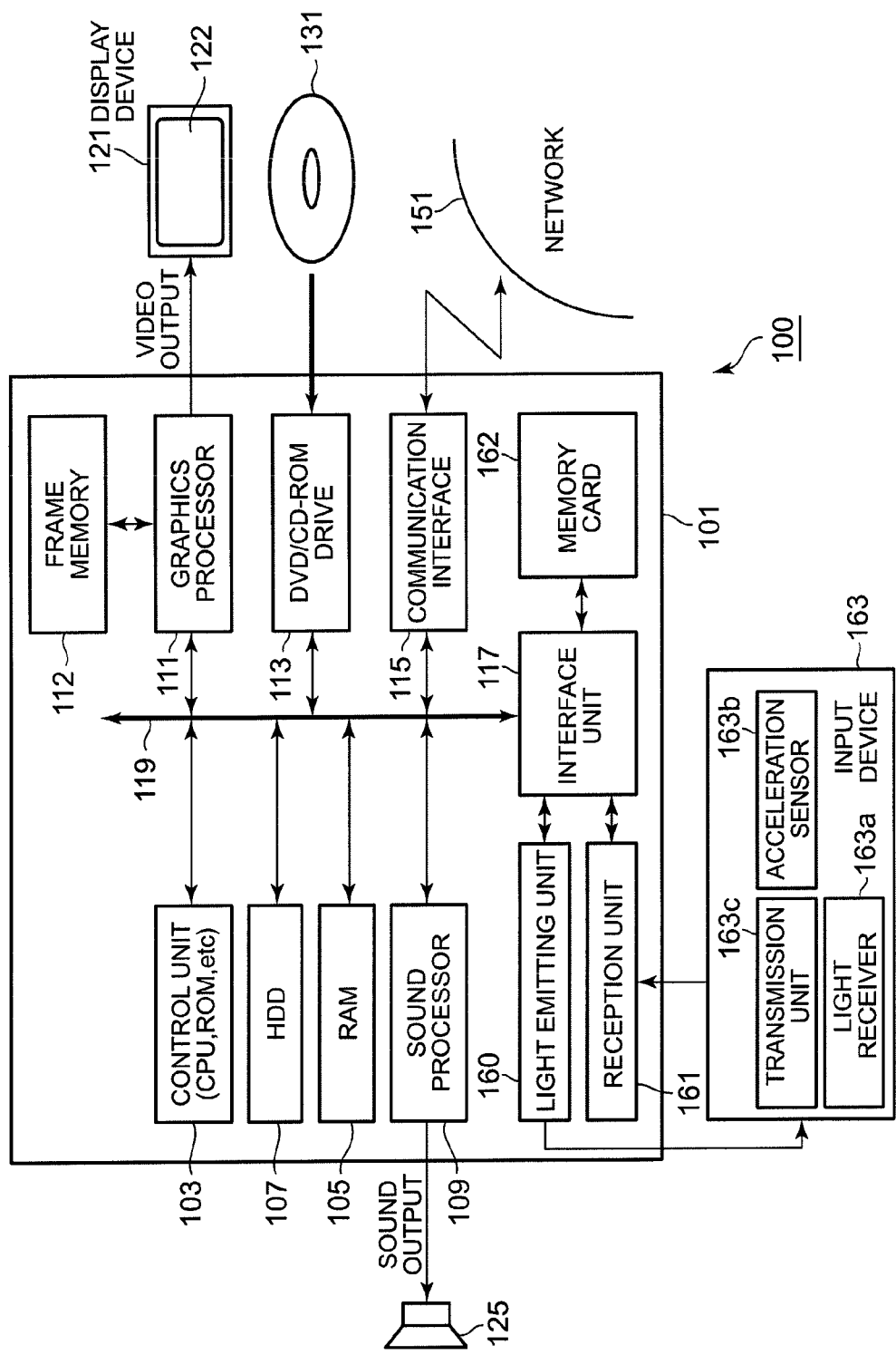
FIG. 2 is a block diagram showing the configuration of a video game apparatus shown in FIG. 1.

FIG. 2 is a block diagram showing the configuration of the video game apparatus 100 shown in FIG. 1. As illustrated, the video game apparatus 100 has a main body 101 as its main unit. The main body 101 includes a control unit 103, a RAM (Random Access Memory) 105, a hard disk drive (HDD) 107, a sound processor 109, a graphics processor 111, a DVD/CD-ROM drive 113, a communication interface 115, and an interface unit 117, all of which are connected to an internal bus 119.

The sound processor 109 of the main body 101 is connected to a sound output device 125 or a speaker, and the graphics processor 111 is connected to a display device 121 having a display screen 122. A recording medium (in this embodiment, DVD-ROM or CD-ROM) 131 is mountable in the DVD/CD-ROM drive 113. The communication interface 115 is connected to the network 151. A light emitting unit 160, a reception unit 161, and a memory card 162 are connected to the interface unit 117.

The control unit 103 includes a CPU (Central Processing Unit), and a ROM (Read Only Memory), and executes a program stored in the HDD 107 or on the recording medium 131 to control the main body 101. The control unit 103 includes an internal timer. The RAM 105 is used as a work area for the control unit 103. The HDD 107 is a storage area for storing programs and data. When instructed to output sounds by a program which is being executed by the control unit 103, the sound processor 109 interprets the instruction and outputs sound signals to the sound output device 125.

The graphics processor 111 maps image data in a frame memory 112 (which is shown outside the graphics processor 111 in FIG. 2 but is actually provided in a RAM included in a chip composing the graphics processor 111) in accordance with a drawing instruction output from the control unit 103, and outputs video signals to display images on the display screen 122 of the display device 121. One frame time of images in the video signals output from the graphics processor 111 is, for example, 1/30 sec. There are two sets of frame memories 112, one for writing and the other for reading, which are switched from one to the other for each frame period.

The DVD/CD-ROM drive 113 reads out programs and data from the recording medium 131. The communication interface 115 is connected to the network 151 to communicate with other computers. The light emitting unit 160 includes a plurality of LEDs having light irradiating directions different from one another, and is located in a position having a predetermined relation with the display device 121 (above or under the display device 121).

The input device 163 includes a light receiver 163a, an acceleration sensor 163b, and a transmission unit 163c. The light receiver 163a receives light emitted from each LED included in the light emitting unit 160. The number and positions of LEDs whose lights can be received by the light receiver 163a vary depending on the direction of the input device 163. The acceleration sensor 163b includes a multi-axis acceleration sensor having three or more axes, and detects the inclination and three-dimensional motion of the input device 163. The input device 163 has directional keys and a plurality of operation buttons.

The transmission unit 163c transmits an infrared signal according to the condition of the input device 163, more specifically, an infrared signal according to the light receiver 163a, the inclination of the input device 163, the direction and speed of the motion of the input device 163 which are detected by the acceleration sensor 163b, and inputs from the directional keys and the operation buttons of the input device 163. The infrared signal transmitted from the transmission unit 163c is received by the reception unit 161 as input data from the input device 163.

The input device 163 is used to perform a predetermined process, such as moving a player character (to be described later) by operating the directional keys. The directional keys are also used to move a cursor, and the operation buttons are used input predetermined instructions. The action of a player character (to be described later) is sequentially selected by the player operating the directional keys, and the selection is set by operating a specific operation button. A special move which gives a stronger damage than the damage given by a normal attack on an opponent character in a battle is affected by a combination of operations of the input device 163. The player character which has made a special move makes a more showy action, such as making a big jumping, than that made in the normal attack. This special move will be further described later.

The interface unit 117 outputs input data received by the input unit 161 to the RAM 105. The control unit 103 interprets the input data and performs an arithmetic operation. In response to an instruction from the control unit 103, the interface unit 117 stores data representing the progress state of the game stored in the RAM 105 in the memory card 162, and reads out data on the game stored in the memory card 162 at the time the game has been suspended, and transfers the data to the RAM 105.

The programs and data for playing the game on the video game apparatus 100 are initially stored in, for example, the recording medium 131. The data stored in the recording medium 131 includes graphic data for creating objects present in the game space (the field formed in the game space, the player's own player character, other player characters, the opponent characters). The programs and data which are stored in the recording medium 131 are read out by the DVD/CD-ROM drive 113 and are loaded onto the RAM 105 at the time of execution. The control unit 103 processes the programs and data loaded onto the RAM 105, outputs a drawing instruction to the graphics processor 111, and outputs a sound output instruction to the sound processor 109. Intermediate data which is produced while the control unit 103 is performing the processing is stored in the RAM 105.

Figure 3:
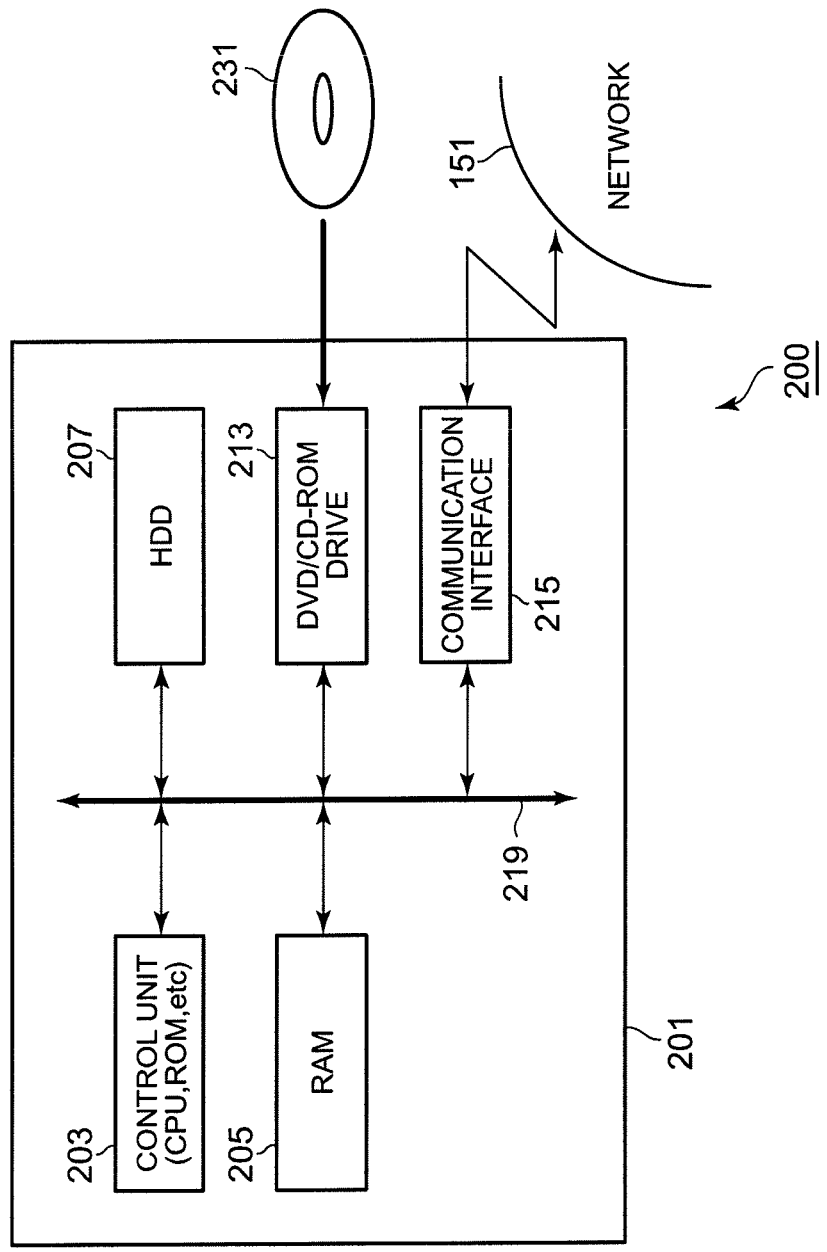
FIG. 3 is a block diagram showing the configuration of a server apparatus shown in FIG. 1.

FIG. 3 is a block diagram showing the configuration of the server apparatus 200 shown in FIG. 1. As shown, the server apparatus 200 has a main body 201 as its main unit. The main body 201 includes a control unit 203, a RAM 205, a hard disk drive (HDD) 207, a DVD/CD-ROM drive 213, and a communication interface 215, all of which are connected to an internal bus 219. A recording medium (DVD-ROM or CD-ROM) 231 is mounted in the DVD/CD-ROM drive 213.

The control unit 203 includes a CPU and a ROM, and executes a program stored in the HDD 207 or on the recording medium 231 to control the server apparatus 200. The control unit 203 includes an internal timer that measures a current time. The RAM 205 is used as a work area for the control unit 203. The HDD 207 is a storage area for storing programs or data. The communication interface 215 is connected to the network 151 to communicate with each video game apparatus 100.

The programs and data for playing a network game on the server apparatus 200 are initially stored in, for example, the recording medium 231, and are installed in the HDD 207 therefrom. The programs and data are read out from the HDD 207 and are loaded onto the RAM 205 at the time of execution. The control unit 203 processes the programs and data loaded onto the RAM 205, and progresses with the network game based on data transmitted from each video game apparatus 100. Intermediate data which is produced while the control unit 203 is performing the processing is stored in the RAM 205.

In the network game according to this embodiment, a field is formed in virtual three-dimensional space as space where player characters move, each player moves the player's own player character on the field by operating the input device 163 to thereby progress with the game. A position in the virtual three-dimensional space where the field is formed is uniquely specified by coordinates in a world coordinate system (X, Y, Z). Graphic data of each object present on the field is formed by a plurality of polygons with vertices whose coordinates are indicated by coordinates in the world coordinate system.

A player character is formed by a plurality of polygons with vertices whose coordinates are indicated by coordinates in a local coordinate system (x, y, z). A substantially center point of a player character is set as a reference point. The position of a player character in the virtual three-dimensional space is indicated by the coordinates of the reference point in the world coordinate system. The direction of a player character is represented by angles formed by individual axes of the local coordinate system to the respective axes of the world coordinate system.

At the time of performing a display process, the coordinates of the characteristic points of every object (vertices of each polygon) included in a visible range are converted to coordinates in the world coordinate system. The moving direction of a player character is decided based on the positional relation between the position of the player character in the current frame period and the position of the player character in the previous frame period.

Figure 4:
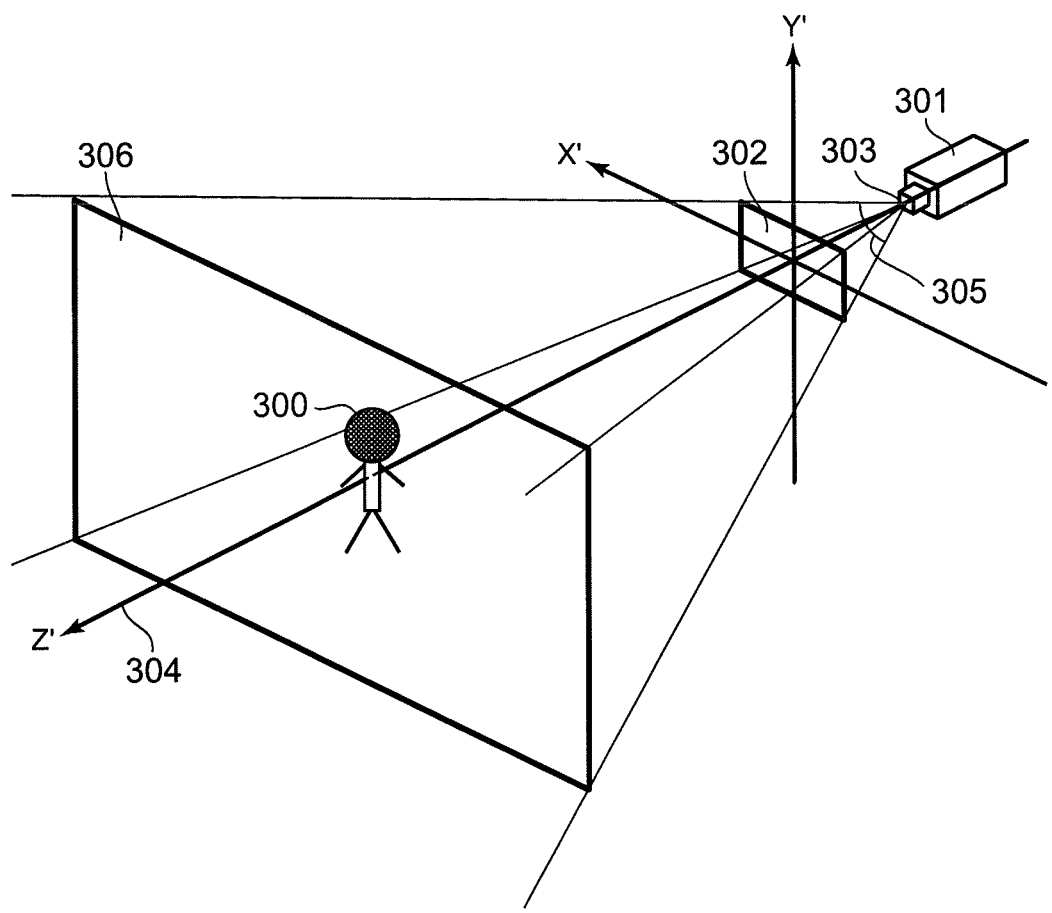
FIG. 4 is a diagram exemplarily illustrating a process of displaying perspectively transformed virtual three-dimensional space containing a player character.

How characters in the virtual three-dimensional space including the player characters of the individual players move in the space is displayed on the display screen 122 through perspective transformation of the virtual three-dimensional space with a virtual camera, and is identified by the individual players. FIG. 4 exemplarily illustrates how the perspective transformation takes place. A virtual camera 301 is placed in the virtual three-dimensional space, and an image projected on a virtual screen 302 is an image to be displayed on the display screen 122.

The position of the virtual camera 301 is a viewpoint 303, the direction of the virtual camera 301 is a visual axis 304, and a region formed by four lines connecting the viewpoint 303 to the vertices of the virtual screen 302 at the four corners is a visual field 305. The size of the virtual screen 302 is fixed, so that with the width of the visual field 305 set, the position of the virtual screen 302 is decided, while with the position of the virtual screen 302 set, the width of the visual field 305 is decided.

Since the visual axis 304 passes through the center point of the virtual screen 302, a reference point (reference position of a player character 300 herein) always comes to the center point of the display screen. A clip surface 306 is set at a predetermined distance from the viewpoint 303 in the direction of the visual axis 304, so that a clipping range or a range in the virtual three-dimensional space where an image is generated through perspective transformation (i.e., visible range) ranges from the virtual screen 302 to the clip surface 306 in the range of the visual field 305.

The player character 300 serving as a reference point becomes another player character which is making a special move when the video game apparatus 100 is receiving exclusive camera information (by which another player character which is making a special move can be specified) transmitted from the server apparatus 200 while the other player character is making the special move. Otherwise, the player character 300 to be a reference point is the player's own player character which is manipulated by the player using each respective video game apparatus 100.

As apparent from the above, the coordinate system that is used to project an image on the virtual screen 302 is a viewpoint coordinate system (X', Y', Z'), and the direction of the visual axis 304 is the Z' axis of the viewpoint coordinate system. Coordinates in the world coordinate system (including coordinates converted from coordinates in the local coordinate system) are converted to coordinates in the viewpoint coordinate system after which a process for perspective transformation including a process of deleting a hidden screen to be discussed next is carried out.

In case of generating an image projected on the virtual screen 302 through perspective transformation, it is necessary to a hidden-screen deletion of deleting a screen which is hidden due to presence of another object on a front screen. A Z-buffer method is used herein as the method for the hidden-screen deletion. After converting coordinates in the world coordinate system to coordinates in the viewpoint coordinate system, the control unit 103 sends the coordinates of the individual characteristic points and a drawing instruction to the graphics processor 111. Based on the drawing instruction, the graphics processor 111 updates the value of the Z buffer so as to leave data (values of Z') of points on the front screen (small points with the Z' coordinates) for the individual characteristic points, and maps image data into the frame memory 112 for the points every time the values are updated.

The perspective transformation should be premised on that the position of the viewpoint 303 of the virtual camera 301, the direction of the visual axis 304, the size of the visual field 305 (distance from the viewpoint 303 to the virtual screen 302), and the distance from the viewpoint 303 to the clip surface 306 (hereinafter called "clipping distance") have been decided. The position of the virtual screen 302 is naturally determined once those parameters are decided.

When the video game apparatus 100 is not receiving exclusive camera information, the position of the viewpoint 303 is kept at a given distance from the player's own player character in a predetermined direction, and moves following up the movement of the player character 300. The direction of the visual axis 304 is set constant so as to always face the reference point of the player's own player character. It is assumed that the size of the visual field 305 and the clipping distance are basically set to the same size.

When the video game apparatus 100 is receiving exclusive camera information, the position of the viewpoint 303 moves to a position indicated by the exclusive camera information (this position is kept at a given distance from another player character making a special move in a predetermined direction, and moves following up the movement of this another player until termination of the special move). The direction of the visual axis 304 is set constant so as to always face the reference point of the special-move making player character. It is assumed that the size of the visual field 305 and the clipping distance are basically set to the same size.

In the game provided by the network game system according to the embodiment, the player character 300 which becomes a reference to control the virtual camera 301 is decided, and deciding this position permits the range of the virtual three-dimensional space to be displayed on the display screen 122 to be uniquely determined. The positions and operational states of player characters including the player character 300 in the game space are managed by the server apparatus 200 as will be described later.

Figure 5A:
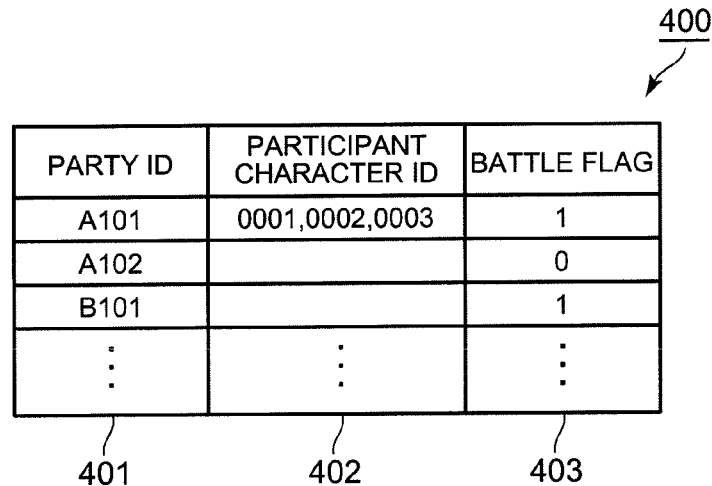
FIG. 5A is a diagram showing a party management table which is managed by the server apparatus shown in FIGS. 1 and 3.
Figure 5B:
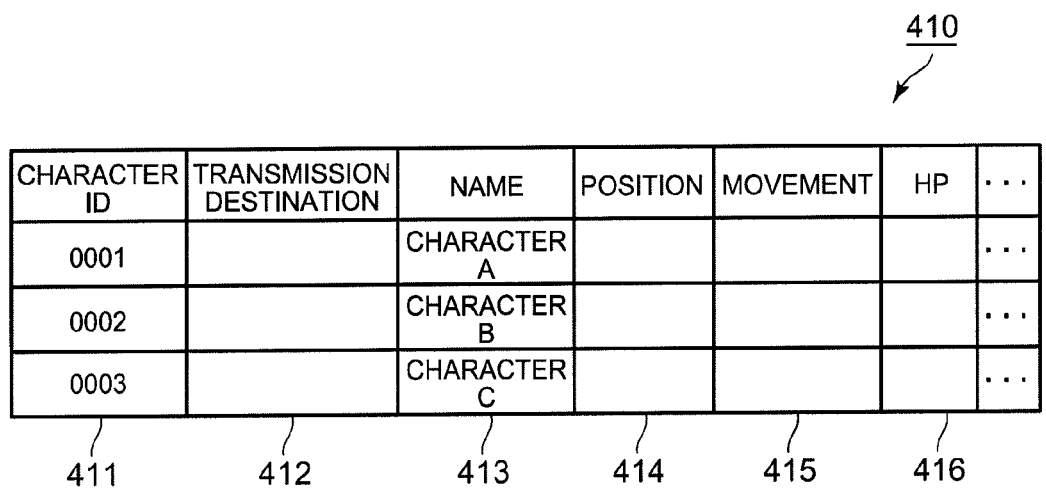
FIG. 5B is a diagram showing a character management table which is managed by the server apparatus shown in FIGS. 1 and 3.

To progress with the network game according to the embodiment, data which is managed by the server apparatus 200 will be described. FIGS. 5A and 5B show tables which are managed by the server apparatus 200 to play the network game according to the embodiment. FIG. 5A shows a party management table 400 managing states for the individual parties present in the network game according to the embodiment. FIG. 5B shows a character management table 410 which is generated for each party to manage the positions, the movement states, etc. of player characters which form the party.

The party management table 400 shown in FIG. 5A stores a party ID 401, a participant character ID 402, and a battle flag 403 for each party. The party ID 401 is identification information for uniquely identifying each party present on the field. The participant character ID 402 includes all character IDs (to be described later) forming the party.

The battle flag 403 indicates whether the party is bound by a process relating to a battle. The battle flag 403 is ON (1) when the party is engaging with a battle, and is OFF (0) otherwise.

The character management table 410 shown in FIG. 5B stores at least a character ID 411, a destination address 412, name information 413, position information 414, movement state information 415, and HP information 416 for each of player characters forming a party. The character ID 411 is identification information for uniquely identifying each player character present on a field. The destination address 412 is an IP address assigned to specify a video game apparatus 100 which manipulates an individual player character. The name information 413 is used as information to display the name of a player character on the display screen 122.

The position information 414 indicates the position of a player character on a field or a battle field. The movement state information 415 indicates in what movement state (mode which is changed by movement) a player character is, and is updated according to movement information transmitted from each video game apparatus 100. While the player character is making a special move, the movement information is added with information indicating such a movement.

The HP information 416 indicates the value of HP of the player character (value of capability indicating a survival value of each player character in the game space, and normally, the game cannot continue when the value becomes "0"). Although HP is increased/decreased according to the progress of the game, HP information 416 is not changed while another player character is making a special move (the HP information 416 of the player character making a special move may be changed).

Because data managed by the video game apparatus 100 does not contain data characterizing the invention except for data received from the server apparatus 200 (which is temporarily stored in the RAM 105), its detailed description will not be given. When exclusive camera information is stored in the RAM 105 as data received from the server apparatus 200, however, control on the virtual camera 301 is changed according to the exclusive camera information.

In the network game system according to the embodiment, in accordance with a movement instruction input (it is input by, for example, selecting a movement item from a menu operating the directional keys and setting the input operating a "O" button) through the input device 163 by a player using each video game apparatus 100, the control unit 103 specifies the movement state of the player character of the player, and transmits movement information indicative of the specified movement state to the server apparatus 200. When the specified movement state is a movement state at any point of time from the initiation of a special move to the end thereof, the movement information is added with information indicative of the special move.

For each party, game progress information indicating the position and movement state of each player character belonging to the party and the position and movement state of each non-player character (including each opponent character) against which the party is battling is transmitted to each video game apparatus 100 from the server apparatus 200. When a player character making a special move is present in the party (regardless of whether it is the player's own player character or another player character), exclusive camera information (e.g., the ID of this player character and information on the position at which the virtual camera 301 is controlled) for controlling the virtual camera 301 based on the player character making the special move is added to the game progress information.

The video game apparatus 100 acquires game progress information transmitted from the server apparatus 200 every frame period (but re-acquires game progress information of the previous frame when failing the acquisition of the game progress information). When exclusive camera information is not added to the game progress information, the video game apparatus 100 controls the virtual camera 301 based on the player character corresponding to this video game apparatus 100, and receives the movement instruction input from the input device 163.

When exclusive camera information is added to the acquired game progress information, the video game apparatus 100 controls the virtual camera 301 based on the player character specified by the exclusive camera information, not the player character corresponding to this video game apparatus 100, and does not receive the movement instruction input from the input device 163. In other words, when exclusive camera information is added, i.e., when there is another player character making a special move, a screen basing on the player's own player character is switched to a screen basing on this special-move making player character. At the time of switching the screen basing on the player's own player character to the screen basing on the special-move making player character, a predetermined transition screen is displayed for a given period of time. A predetermined transition screen is likewise displayed for a given period of time when switching a screen basing on a special-move making player character to a screen basing on the player's own player character.

While the network game system according to the embodiment presents a player character making a special move with a predetermined effect display (e.g., displaying a flare around the player character), information indicating what effect display will be taken is included in the game progress information. When there is a player character making a special move in the party, therefore, the same screen is displayed on the display devices 121 of the video game apparatuses 100 excluding a case where a transition screen is displayed (excluding the video game apparatus 100 whose player's own player character is the player character making a special move).

Figure 6:
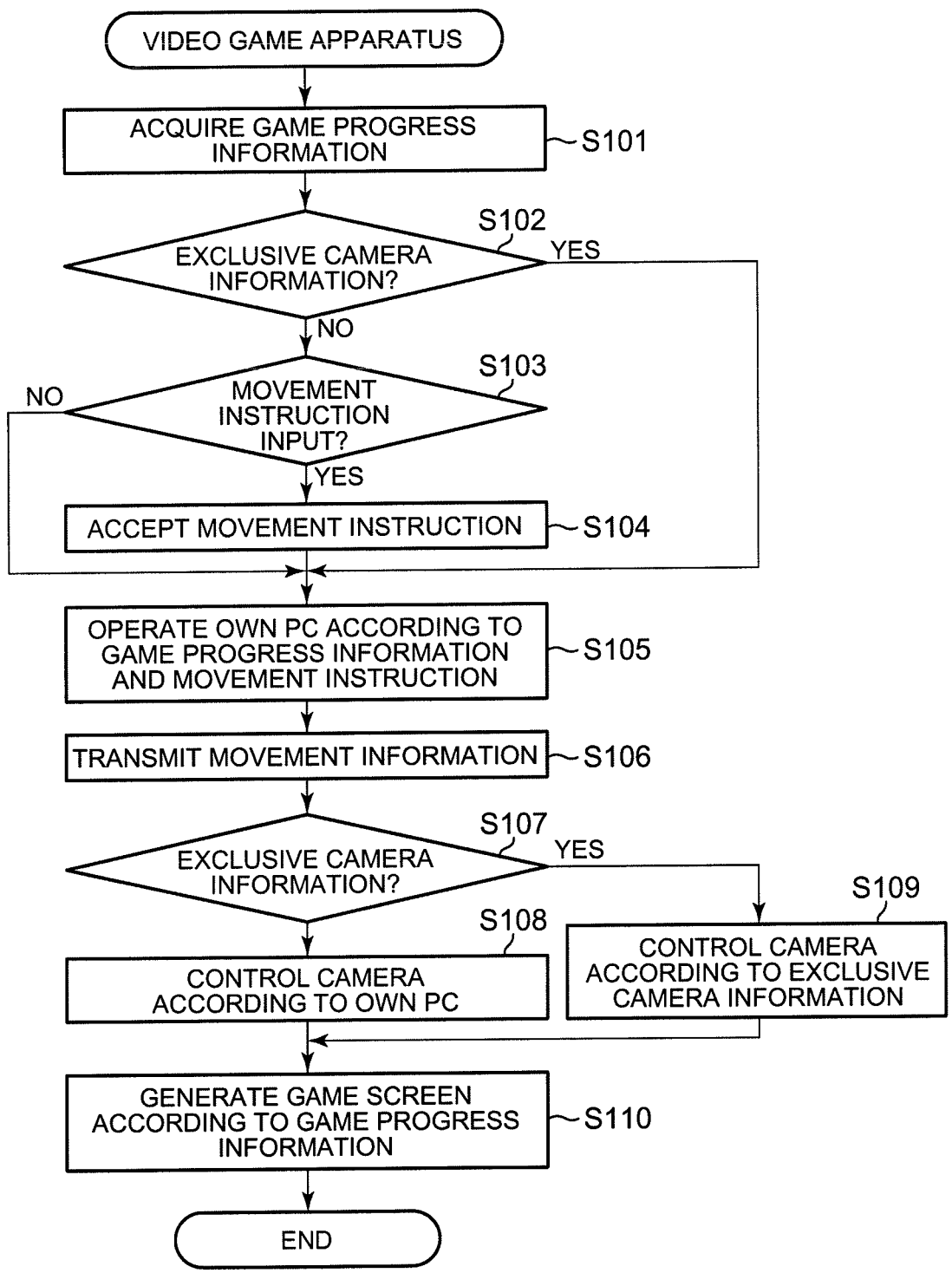
FIG. 6 is a flowchart illustrating a routine which is executed by the video game apparatus.
Figure 7:
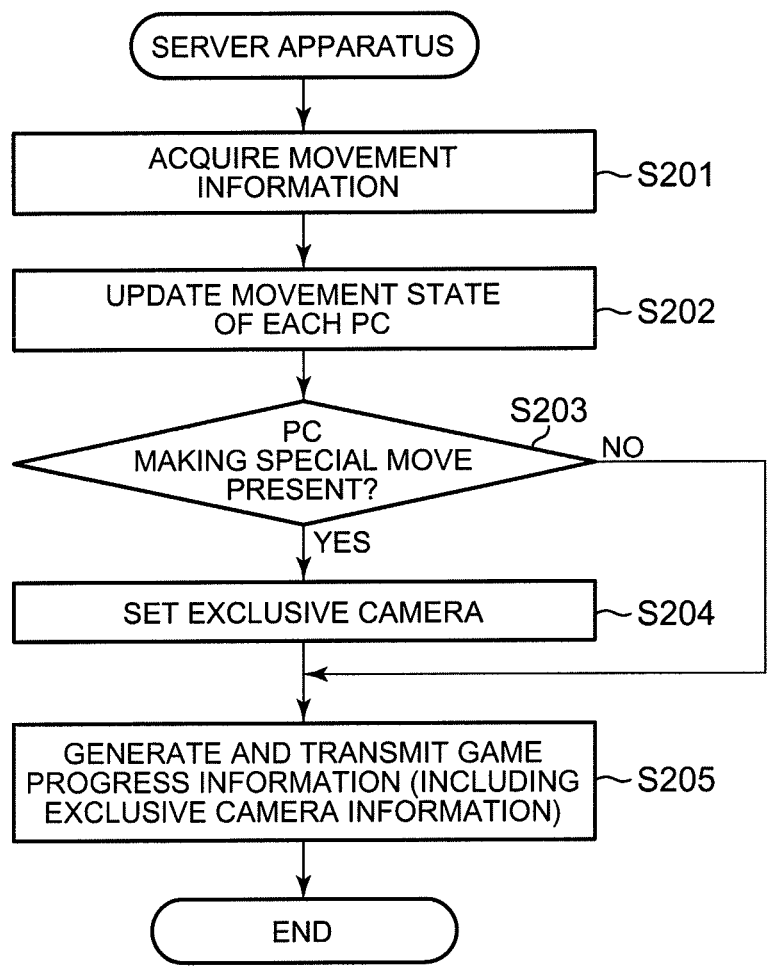
FIG. 7 is a flowchart illustrating a routine which is executed by the server apparatus.

The following will describe routines which are carried out by the network game system according to the embodiment. FIG. 6 is a flowchart illustrating a routine which is executed by the video game apparatus 100. FIG. 7 is a flowchart illustrating a routine which is executed by the server apparatus 200. The routine which is carried out by the video game apparatus 100 includes processes other than the steps illustrated in the flowchart in FIG. 6, and the routine which is carried out by the server apparatus 200 includes processes other than the steps illustrated in the flowchart in FIG. 7. FIGS. 6 and 7 illustrate steps which are executed particularly in connection with the invention, steps which are executed in manners similar to the conventional manners may be omitted.

The control unit 103 of the video game apparatus 100 carries out the routine of the flowchart illustrated in FIG. 6 every frame period. The control unit 103 fetches game progress information, transmitted from the server apparatus 200 and saved in the reception buffer in the RAM 105, into a predetermined area in the RAM 105 before the frame period starts (step S101). When the acquisition of the game progress information has failed before the start of the frame period, the control unit 103 proceeds with the routine assuming that the game progress information fetched in the predetermined area in the RAM 105 in the previous frame period has been fetched therein.

The control unit 103 determines whether exclusive camera information is added to the game progress information acquired in step S101 (step S102). When the exclusive camera information is added to the game progress information, the control unit 103 proceeds to a process in step S105 directly. When the exclusive camera information is not added to the game progress information, the control unit 103 determines whether the an movement instruction on the player's own player character is input from the input device 163 before the frame period starts (step S103). When no movement instruction is input, the control unit 103 proceeds to a process in step S105 directly.

When a movement instruction is input, the control unit 103 accepts the movement instruction and stores it in the predetermined area in the RAM 105 (step S104). The movement instruction stored in the RAM 105 is kept stored in the RAM 105 until the entire movement of the player's own player character based on the movement instruction is completed. Then, the control unit 103 proceeds to the process in step S105.

In step S105, the control unit 103 specifies the movement state of the player's own player character according to the game progress information stored in the RAM 105 in the present frame period and the movement instruction stored in the RAM 105. If a movement instruction is stored in the present frame period for the first time, the control unit 103 causes the player's own player character to start the movement according to the movement instruction. When a movement instruction corresponding to the movement which has already started is still stored in the RAM 105, the control unit 103 causes the player's own player character to continue the movement according to the movement instruction.

When exclusive camera information is added to the game progress information stored in step S101, a movement instruction, even when input from the input device 163, is not fetched, so that the control unit 103 does not cause the player's own player character to start the movement. When the movement instruction fetched in the previous frame period or earlier is stored in the RAM 105, the control unit 103 continues the movement of the player's own player character according to the movement instruction.

Next, the control unit 103 causes the communication interface 115 to transmit movement information indicative of the specified movement of the player's own player character and the position of the player's own player character to the server apparatus 200 over the network 151 (step S106).

The control unit 103 determines again whether exclusive camera information is added to the game progress information acquired in step S101 (step S107). When the exclusive camera information is not added to the game progress information, the control unit 103 controls the virtual camera 301 according to the position and movement state of the player's own player character indicated by the game progress information. More specifically, the control unit 103 sets the position of the viewpoint 303 of the virtual camera 301 in a predetermined position which is determined according to the position of the player's own player character, and sets the direction of the visual axis 304 of the virtual camera 301 using the reference point of the player's own player character as a reference point (step S108). Accordingly, the position of the virtual screen 302 and position of the clip surface 306 are uniquely determined. Then, the control unit 103 proceeds to a process in step S110.

When the exclusive camera information is added to the game progress information, the control unit 103 controls the virtual camera 301 according to the exclusive camera information added to the game progress information. More specifically, the control unit 103 sets the position of the viewpoint 303 of the virtual camera 301 in a predetermined position which is determined according to the position of a player character (player's own player character or another player character) indicated by the exclusive camera information and sets the direction of the visual axis 304 of the virtual camera 301 using the reference point of the player character as a reference point (step S109). Accordingly, the position of the virtual screen 302 and position of the clip surface 306 are uniquely determined. Then, the control unit 103 proceeds to the process in step S110.

In step S110, the control unit 103 generates a display screen 122 according to the game progress information acquired in step S101 (actually, a screen to be displayed on the display device 121 in a next frame or any subsequent frame). More specifically, the control unit 103 perspectively transforms each object present in the virtual space (the player's own player character and other player characters included in the visible range, and the terrain of a field, and an object for an effect display) on the virtual screen 302, converts the coordinates of the vertices of each polygon forming each of the objects to the coordinates in the viewpoint coordinate system. The control unit 103 outputs a drawing instruction together with information of each polygon forming each of the objects (including the converted coordinates in the viewpoint coordinate system) to the graphics processor 111. The routine that is carried out by the control unit 103 of the video game apparatus 100 in the present frame period is terminated.

The graphics processor 111 which has received the drawing instruction from the control unit 103 maps the image of each polygon, provided together with the drawing instruction, into the frame memory 112 by referring to the Z buffer. The graphics processor 111 reads an image mapped into the frame memory 112 every frame period, and outputs a video signal which is the read image added with a sync signal to the display device 121. As a result, a game image showing the player's own player character (when there is no exclusive camera information) or a player character making a special move (when there is exclusive camera information) positioned in the center of the display screen 122 is displayed.

The control unit 203 of the server apparatus 200 carries out the routine of the flowchart illustrated in FIG. 7 every frame period (the time interval as one frame period in the video game apparatus 100). The control unit 203 fetches game progress information, transmitted from the video game apparatus 100 and saved in the reception buffer in the RAM 205, into a predetermined area in the RAM 205 before the frame period starts (step S201). The control unit 203 updates the position information 414 and movement state information 415 of each player character in the table in FIG. 5B (step S202).

The control unit 203 determines for each party whether there is a player character making a special move (step S203). With regard to a party which does not have a player character making a special move, the control unit 203 proceeds to a process in step S205 without setting the exclusive camera. With regard to a party which has a player character making a special move, the control unit 203 sets the exclusive camera according to the player character making the special move, and temporarily saves information indicative of the setting (step S204). Then, the control unit 203 proceeds to the process in step S205.

In step S205, for each party, the control unit 203 generates game progress information indicating the position and movement state of each player character belonging to the party, and further indicating the position and movement state of a non-player character present near the party. With regard to a party which has a player character making a special move, exclusive camera information according to the exclusive camera set in step S204 is included in the game progress information. The control unit 203 transmits the generated game progress information to each video game apparatus 100. The game progress information to be transmitted is for the party in which the player character of the player using each video game apparatus 100 is present. The routine that is carried out by the control unit 203 of the server apparatus 200 in the present frame period is terminated.

The following will explain, by way of a specific example, display images in a battle which are displayed on the display screen 122 of the video game apparatus 100 constituting the network game system according to the embodiment, particularly, display images when one of the players makes a special move in a battle. FIGS. 8A to BE are diagrams showing specific examples of display screens of individual video game apparatuses 100 during a battle.

In this example, it is assumed that there are four player characters 301A to 301D forming a party, and the player character 301A thereamong will make a special move in a battle with opponent characters 302A to 302C. Hereinafter, the video game apparatus 100 corresponding to the player character which makes a special move is referred to as "video game apparatus A", and a video game apparatus 100 corresponding to a player character which does not make a special-move is referred to as "video game apparatus B". Display screens 122A, 122B which are displayed on the display devices 121 of the video game apparatuses A, B at the same timing are shown time-sequentially in FIGS. 8A to 8E.

It is assumed that none of the player characters forming the party have made a special move at the timing in FIG. 8A. The display screen 122A of the video game apparatus A shows an image showing a player character 301A or the player's own player character of the player who uses the video game apparatus A in the center (because the visual axis 304 of the virtual camera 301 is directed toward the player character 301A). The display screen 122B of the video game apparatus B shows an image showing a player character 301B or the player's own player character of the player who uses the video game apparatus B in the center (because the visual axis 304 of the virtual camera 301 is directed toward the player character 301B).

Suppose that the player of the video game apparatus A manipulates the input device 163 to cause the player's own player character to start a special move. The display screen 122A of the video game apparatus A shows an image showing a player character 301A or the player's own player character of the player who uses the video game apparatus A in the center. The display screen 122B of the video game apparatus B shows a transition screen for switching the image showing the player character 301B in the center to the image showing the player character 301A in the center.

It is assumed that displaying the transition screen is terminated at the timing in FIG. 8C, and the player character 301A or the player's own player character of the player using the video game apparatus A continues the special move which has started at the timing in FIG. 8B. The display screen 122A of the video game apparatus A shows an image showing the player character 301A or the player's own player character of the player using the video game apparatus A in the center. Because the game progress information transmitted from the server apparatus 200 includes exclusive camera information, the display screen 122B of the video game apparatus B also shows an image showing the player character 301A in the center (due to the visual axis 304 of the virtual camera 301 being directed toward the player character 301A).

It is assumed that the player character 301A or the player's own player character of the player using the video game apparatus A has completed the special move which has started at the timing in FIG. 8D. The display screen 122A of the video game apparatus A shows an image showing the player character 301A or the player's own player character of the player using the video game apparatus A in the center. The display screen 122B of the video game apparatus B shows a transition screen for switching the image showing the player character 301A in the center to the image showing the player character 301B in the center.

Displaying the transition screen is terminated at the timing in FIG. 8E. As in the case of FIG. 8A, the display screen 122A of the video game apparatus A shows an image showing the player character 301A or the player's own player character of the player using the video game apparatus A in the center. The display screen 122B of the video game apparatus B also shows an image showing the player character 301B or the player's own player character of the player using the video game apparatus B in the center.

In the network game system according to the embodiment, as described above, a plurality of player characters respectively using a video game apparatuses 100 participate in a game provided by the server apparatus 200. Of the player characters participating in the game, two or more player character form a party, and the player characters belonging to the party cooperate with each other to battle with an opponent character.

Each video game apparatus 100 generates a display screen 122 indicating the progress state of the game based on game progress information which is transmitted from the server apparatus 200 every frame period according to the progress state of the game, and displays the display screen 122 on the display device 121. The display screen 122 to be displayed on the display device 121 of each video game apparatus 100 is normally a screen basing on the player character of the player using the video game apparatus 100 (i.e., screen showing the player character positioned in the center by directing the visual axis 304 of the virtual camera 301 toward this player character).

Each player character which is caused to participate in the game provided by the server apparatus 200 is moved according to a movement instruction input from the input device 163 by the player who uses the corresponding video game apparatus 100. Depending on the movement instruction input by the player, the player character may make a special move in a battle. Movement information including information on the presence/absence of a special move is transmitted to the server apparatus 200 from each video game apparatus 100 to update the position information 414 and movement state information 415 of each player character stored in the table in the server apparatus 200.

Referring to the movement state information 415 stored in the table, the server apparatus 200 determines for each party whether there is a player character making a special move. The server apparatus 200 transmits the game progress information including exclusive camera information to each video game apparatus 100 of the player belonging to the party which is determined to have a player character making a special move. The exclusive camera information serves to specify a player character making a special move in the party, and control the virtual camera 301 according to the special-move making player character.

When there is a player character making a special move, not necessarily the player's own player character, and thus each video game apparatus 100 is receiving exclusive camera information, each video game apparatus 100 displays a screen basing on the special-move making player character (i.e., screen showing the special-move making player character positioned in the center by directing the visual axis 304 of the virtual camera 301 toward this player character) on the display device 121.

A special move is a more powerful attack on an opponent character than a normal attack, and its action is more showy than the action of a normal attack. A player character making a special move significantly affects the progress of a battle, and the special-move making player character being seen by every player in the same party increases the lively feeling of the game. Since the player who has made the player's own player character to make a special move by inputting an movement instruction from the input device 163 can cause the other players in the same party to see the special move with a showy action, the player's desire to stand out most (to make the player's own player character stand out) in the game is fulfilled.

The player character making a special move is provided with an effect display like a flare, so that the other players can be caused to see not only the action of a special move but also the effect display accompanying the action, the lively feeling of the game is increased further, not to mention that the player's desired to stand out in the game is fulfilled.

While there is a player character making a special move, and a screen basing on the player character who has made a special move is displayed on the video game apparatuses 100 of all the players, a movement instruction from the input device 163 is not accepted. This can prevent the showy action of the special-move making player from being interfered with the movements of the other player characters.

Because a movement instruction from the input device 163 for any player character other than the player character who has made a special move is not accepted, even if a screen basing on the player character who has made a special move is displayed on the video game apparatus 100 of each of the other players, hiding his/her own player character, the operation on the video game apparatus 100 does not cause inconvenience. While a screen basing on the player character who has made a special move is displayed, the HP information 416 of each of the other player characters than the special-move making player character is not changed. Because the player's own player characters of the players who manipulate the player characters other than the player character who has made the special move will not be disabled to battle while the manipulation is being disabled, those players may not have big complains about their own player characters being disabled.

At the time of switching a screen basing on the player's own player character to a screen basing on another player character making a special move, or at the time of switching a screen basing on another player character making a special move to a screen basing on the player's own player character, a predetermined transition screen is displayed for a given period of time. This can prevent any player who has experienced the screen transition from feeling uncomfortable about an abrupt change in the player character displayed in the center of the display screen 122.

The invention is not limited to the foregoing embodiment, and is modifiable and applicable in various forms. Some modifications of the embodiment which are applicable to the invention will be described blow.

According to the embodiment, an exclusive camera is set for a player character making a special move in a party, and the video game apparatuses 100 corresponding to all the player characters belonging to the party to display a screen basing on the player character making the special move. Of course, the criterion to select a player character for which the exclusive camera is set is not limited to this criterion, and the exclusive camera may be set for a player character which is in a some sort of a special movement state.

When there is a player character which is making a predetermined dance as the special movement state, for example, the exclusive camera may be set for the player character making the predetermined dance. In this case, the movements of other player characters than the player character making the predetermined dance for which the exclusive camera is set can be made to match the movement of the player character making the predetermined dance for which the exclusive camera is set regardless of the manipulation on the input devices 163 by the corresponding players.

For example, player characters other than the player character making a predetermined dance may dance as back dancers for the player character making the predetermined dance (with exactly the same choreography or with a choreography including different portions). The player characters other than a player character making a predetermined dance may cheer the player character making the predetermined dance. Alternatively, the player characters other than a player character making a predetermined dance may not make any special movement but see the player character making the predetermined dance.

According to the embodiment, when there is a player character making a special move in a party, and the video game apparatuses 100 of the other players in the same party generate screens basing on the special-move making player character, the HPs of the player characters other than the special-move making player character are not changed. In such a case, of course, the player characters other than the special-move making player character cannot have their HPs changed, or can be made not to be put at any disadvantage in the game. Even when there is a player character making a special move in the party, the player characters other than the special-move making player character may be made to get a benefit, such as increasing the HP.

According to the embodiment, while an exclusive camera is set for a player character making a special move in a party, and a screen basing on the special-move making player character is displayed on the video game apparatuses 100 corresponding to all the player characters belonging to the party, a movement instruction input from the input device 163 is not accepted. When there is a movement instruction already accepted, however, the movement of the player character based thereon may be interrupted, and the movement of this player character may be resumed when the special move ends and the setting of the exclusive camera is released. Alternatively, the movement instruction may be canceled so that the movement of this player character may not be resumed upon termination of the special move.

According to the embodiment, each video game apparatus 100 specifies the movement state of the player character corresponding to the video game apparatus 100 based on the a movement instruction input from the input device 163. Instead, each video game apparatus 100 may transmit information indicating a movement instruction input from the input device 163 itself, and the server apparatus 200 upon reception thereof may specify the movement state of each player character based on the received movement instruction.

In this case, regarding a party which is determined to have a player character making a special move, the control unit 203 of the server apparatus 200 may be configured not to move a player character other than the special-move making player character even when receiving information indicative of a movement instruction corresponding to such a player character. Even those player characters which are disabled to move under such control can be set not to be put at a disadvantage like a reduction in HP in the game.

According to the embodiment, control on the virtual camera 301 for displaying a screen based on a player character which is making a special move according to exclusive camera information on each video game apparatus 100 in a party is determined beforehand. Control on the virtual camera 301 when there is a player character making a special move in a party may be previously designed so that how each player will make a special move through an input from the input device 163, and may be registered in the table in the server apparatus 200.

For example, when the player's own player character of the player A makes a special move, the viewpoint 303 of the virtual camera 301 may be set directly above the player's own player character. When the player's own player character of the player B makes a special move, the viewpoint of the virtual camera 301 may be set in front of the player's own player character. Accordingly, when the player character of the player A is making a special move, the video game apparatuses 100 of all the players in the party display an image viewing the player's own player character of the player A directly thereabove, and when the player's own player character of the player B makes a special move, the video game apparatuses 100 of all the players in the party display an image viewing the player's own player character of the player B directly from the front.

Even if the movement of a special move is the same between a case where the player character of the player A is making a special move, and a case where the player character of the player B is making a special move, screens to be displayed on the individual video game apparatuses 100 in the same party differ from one another. This provides a variety of display modes for screens of the game, thus increasing the enjoyment on the screens. Because each player causes other players to see the movement of the player's own player character according to his/her own preference, the player's desire to stand out in the game can be satisfied more.

Control on the virtual camera 301 to display a screen basing on a player character making a special move on each video game apparatus 100 according to exclusive camera information may be designed in such a way that how each player is to perform when another player character makes a special move by an input from the input device 163. In this case, it is unnecessary to register the setting in the table in the server apparatus 200.

For example, the player A may set the position of the viewpoint 303 of the virtual camera 301 directly above the special-move making player character. The player B may set the position of the viewpoint 303 of the virtual camera 301 in front of the special-move making player character. When the player character of the player C is making a special move, the video game apparatus 100 of the player A displays an image viewing the player character of the player C directly thereabove, and the video game apparatus 100 of the player B displays an image viewing the player character of the player C in front thereof.

Accordingly, each player sets a screen displayed on the display device 121 to his/her own preferred screen, even when another player character makes a special move so that a screen basing on the special-move making player character, not the player's own player character, is displayed on the display device 121, thus reducing complaints if any resulting from no screen basing on the player's own player character being displayed. Because the player of a player character which has made a special move can cause other players to view a screen basing on the player's own player character, though screens to be displayed on the video game apparatuses 100 in the same party differ from one another, the player's desired to stand out in the game can be satisfied.

According to the embodiment, when exclusive camera information is added to game progress information acquired in each frame period, the control unit 103 of the video game apparatus 100 disregard movement information on the player's own player character, if input from the input device 163, and does not accept the input movement instruction. That is, in a frame period where exclusive camera information is added to game progress information, inputting of a movement instruction from the input device 163 is made invalid.

By way of contrast, even in a frame period where exclusive camera information is added to game progress information, inputting of a movement instruction from the input device 163 may be accepted. In this case, however, although the accepted movement instruction is stored in the RAM 105, the movement state of the player's own player character is not specified based on the movement instruction accepted in the frame period where the exclusive camera information is added to the game progress information, thus preventing movement information according to the movement instruction from being transmitted to the server apparatus 200.

Upon reception of game progress information to which exclusive camera information is not added in a new frame period (not just a next frame period), the movement state of the player's own player character should be specified based also on the movement instruction accepted in the frame period where the exclusive camera information is added to the game progress information, so that movement information according to the movement instruction is transmitted to the server apparatus 200.

In other words, when a movement instruction is input from the input device 163 in a frame period where exclusive camera information is added to game progress information, the movement of the player's own player character based on the movement instruction may be delayed until game progress information which is not added with exclusive camera information is received. Even in the case where the movement of the player's own player character based on an input movement instruction is delayed, it is possible not to put the player at a disadvantage such as reduction in HP information 416, as in the case where inputting of a movement instruction from the input device 163 is made invalid.

The embodiment of the invention has been described by way of example where a three-dimensional game which generates a game screen through perspective transformation of virtual three-dimensional space with the virtual camera 301 directing the visual axis 304 toward the player's own player character or another player character making a special move according to the presence/absence of exclusive camera information. The invention can however applied to a two-dimensional game (including a two-dimensional game which can be viewed as a pseudo three-dimensional game) which displays part of the two-dimensional game as a game screen.

For example, when there is no player character which is making a special move in a party in a two-dimensional game, each video game apparatus 100 displays a region with a given area around the player's own player character as a game screen. When there is a player character which is making a special move in a party, every video game apparatus 100 corresponding to the party may display a region with a given area around the special-move making player character as a game screen.

Although it is determined whether or not an exclusive camera is set party by party in the foregoing embodiment, an entire game may be set as a unit for determining whether or not to set an exclusive camera in a game where the number of participants in the game is limited to a certain number, such as a sports game or a fighting game, a game not one like RPG where a large number of players participate. When a player character which is in a special movement state like making a special move is present, for example, all the video game apparatuses 100 which are used by the individual players participating in the game may generate a screen basing on the player character in the special movement state.

According to the embodiment, the video game apparatus 100 or a dedicated game apparatus is used as a device which becomes the platform to play a video game. According to the invention, however, a general-purpose personal computer or the like which includes components similar to those of the video game apparatus 100 and has a network connecting capability may be constructed a platform. A portable game apparatus (including a cellular phone having a capability of running applications) which is configured to have the display device 121 and the sound output device 125 accommodated in the same casing as the casing of the main body 101.

A semiconductor memory card may be adopted as the recording medium 131 in place of a DVD-ROM or CD-ROM. A card slot where the memory card is inserted may be provided in place of the DVD/CD-ROM drive 113. In case of a general-purpose personal computer, the program and data according to the invention may be provided in the form of being prestored on the HDD 107, not stored in the recording medium 131. Any recording medium may be optionally used to store and provide the program and data according to the invention according to the physical form of the hardware and the distribution form.

According to the embodiment, the program and data for the video game apparatus 100 are stored in the recording medium 131 for distribution. Instead, the program and data may be stored on a fixed disk apparatus included in the server apparatus located on a network, and distributed to the main body 101 via the network 151. The video game apparatus 100 can save the program and data, received at the communication interface 115 from the server apparatus 200, in the HDD 107, and load them into the RAM 105 at the time the program is run. The program and data which are used in the server apparatus 200 may be stored on a fixed disk apparatus included in another server apparatus located on a network 151, and distributed to the main body 201 via the network 151.

The invention claimed is:

1. A network game system including a server apparatus, and a plurality of terminal apparatuses connected to the server apparatus over a network, wherein each of players who respectively use the terminal apparatuses manipulates a player's own player character to participate in a game provided by the server apparatus, the server apparatus comprising:
a receiver that receives character movement information transmitted from each of the plurality of terminal apparatuses;
a processor that determines whether a presence of a player character showing a special movement state is received by the receiver from each of the plurality of terminal apparatuses;
an interface that, when the processor determines that there is the player character showing the special movement state, transmits special character information for displaying a screen basing on the player character showing the special movement state to each of the plurality of terminal apparatuses;

the processor that further moves the player character corresponding to each of the plurality of terminal apparatuses according to the character movement information received by the receiver to progress with the game; and the interface that further transmits game progress information indicating a progress state of the game progressed by the processor to each of the plurality of terminal apparatuses, each terminal apparatus of the plurality of terminal apparatuses comprising:

a receiver that receives the game progress information transmitted from the interface of the server apparatus;

a graphics processor that generates the screen according to the game progress information received by the receiver of the terminal apparatus, and displays the screen on a display device equipped in the terminal apparatus;

a processor that, as the player who uses the terminal apparatus performs a predetermined operation on an input device equipped in the terminal apparatus, inputs a movement instruction for moving the player's own player character;

the receiver that further receives the special character information transmitted from the interface of the server apparatus; and an interface that generates movement information according to the movement instruction input from the processor, and transmits the movement information to the server apparatus to be received by the receiver of the server apparatus, the game screen display including:

a normal-mode screen display that generates the screen according to the game progress information basing on the player character of the player using the terminal apparatus when the special character information is not received by the receiver of the terminal apparatus; and a special-mode screen display that generates the screen according to the game progress information basing on the player character showing the special movement state according to the special character information when the special character information is received by the receiver of the terminal apparatus.

2. The network game system according to claim 1, wherein the processor of each terminal apparatus further:

specifies a movement of the player character of the player using the terminal apparatus according to the movement instruction; and disables inputting of the movement instruction when the special character information is received by the receiver of the terminal apparatus, and the character movement information indicates the movement of the player character of the player using the terminal apparatus specified by the processor of the terminal apparatus.

3. The network game system according to claim 2, wherein, when the processor of the server apparatus determines that there is the player character showing the special movement state, the processor of the server apparatus progresses with the game so as not to put one of the player characters other than the player character showing the special movement state at a disadvantage.

4. The network game system according to claim 1, wherein the character movement information indicates the movement instruction input by the processor of each terminal apparatus, and when the processor of the server apparatus determines that there is the player character showing the special movement state, the processor of the server apparatus does not permit one of the player characters other than the player character showing the special movement state to move according to the character movement information received from the terminal apparatus corresponding to the player character other than the player character showing the special movement state.

5. The network game system according to claim 4, wherein when the processor of the server apparatus determines that there is the player character showing the special movement state, the processor of the server apparatus permits one of the player characters other than the player character showing the special movement state to move according to the movement of the player character showing the special movement state.

6. The network game system according to claim 1, wherein the special-mode screen display applies different standards to different types of player characters showing the special movement state to generate screens basing on the player characters showing the special movement state based on the game progress information.

7. The network game system according to claim 1, wherein the special-mode screen display includes an effect display that adds a predetermined effect to the player character showing the special movement state.

8. The network game system according to claim 1, wherein the special-mode screen display generates the screen basing on the player character showing the special movement state according to a setting by the player who manipulates the player character showing the special movement state.

9. The network game system according to claim 1, wherein the special-mode screen display generates the screen basing on the player character showing the special movement state according to a setting by the player using the terminal apparatus.

10. The network game system according to claim 1, wherein the game screen display further includes a during-switching-of-screen direction screen display that generates and displays a predetermined during-switching-of-screen direction screen on the display device equipped in the terminal apparatus during switching from generation of the screen by the normal-mode screen display to generation of the screen by the special-mode screen display.

11. The network game system according to claim 1, wherein the game provided by the server apparatus includes a battle in which a party of the player characters respectively corresponding to the plurality of terminal apparatuses battle with at least one opponent character different from the player characters belonging to the party, and the player character showing the special movement state is one of the player characters making a special movement which has a greater influence in the battle than other movements.

12. The network game system according to claim 11, wherein the special movement is visually more showy than the other movements.

13. The network game system according to claim 1, wherein the game provided by the server apparatus is a three-dimensional game permitting the player characters respectively corresponding to the plurality of terminal apparatuses to move in virtual three-dimensional space, the game screen display performs perspective transformation of the virtual three-dimensional space from a viewpoint of a virtual camera to generate the screen according to the game progress information received by the receiver of each terminal apparatus, and the special-mode screen display performs perspective transformation with a visual axis of the virtual camera directed toward the player character showing the special movement state to generate the screen basing on the player character showing the special movement state.

14. A game apparatus connected over a network to a server apparatus providing a game which progresses with a plurality of players manipulating player characters thereof to manipulate the player characters of the players, the game apparatus comprising:
- a receiver that receives game progress information transmitted from the server apparatus and indicating a progress state of the game according to a state of movement of the player characters corresponding to the plurality of players;
- a game screen display that generates a screen according to the game progress information received by the receiver, and displays the screen on a display device of the game apparatus;
- a processor that, as the player who uses the game apparatus performs a predetermined operation on an input device of the game apparatus, inputs a movement instruction for moving the player's own player character;
- the receiver that further receives special character information transmitted when the server apparatus determines that a player character showing a special movement state is included in the plurality of player characters; and
- an interface that generates movement information according to the movement instruction input from the processor, and transmits the movement information to the server apparatus, the game screen display including:
- a normal-mode screen display that generates the screen according to the game progress information basing on a player character of the player using the game apparatus when the special character information is not received by the receiver; and
- a special-mode screen display that generates the screen according to the game progress information basing on the player character showing the special movement state according to the special character information when the special character information is received by the receiver.

15. A non-transitory computer readable recording medium recording a program which is executed by a computer connected over a network to a server apparatus providing a game which progresses with a plurality of players manipulating player characters thereof to manipulate the player characters of the players, the program causing the computer to:
- receive game progress information transmitted from the server apparatus and indicating a progress state of the game according to a state of movement of the player characters corresponding to the plurality of players;
- generating a screen according to the game progress information received from the server, and displaying the screen on a display device equipped in the computer;
- inputting, as a player who uses the computer performs a predetermined operation on an input device equipped in the computer, a movement instruction for moving the player's own player character;
- receiving special character information transmitted from the server apparatus when the server apparatus determines that a player character showing a special movement state is included in the plurality of player characters; and
- generating movement information according to the movement instruction, and transmitting the movement information to the server apparatus, the game screen display including:
- a normal-mode screen display that generates the screen according to the game progress information basing on a player character of the player using the computer when the special character information is not received from the server apparatus; and
- a special-mode screen display that generates the screen according to the game progress information basing on the player character showing the special movement state according to the special character information when the special character information is received from the server apparatus.

* * * * *